(12) United States Patent
Inagaki et al.

(10) Patent No.: US 12,385,148 B2
(45) Date of Patent: Aug. 12, 2025

(54) ELECTROLYTIC SOLUTION GENERATION DEVICE

(71) Applicant: Panasonic Intellectual Property Management Co., Ltd., Osaka (JP)

(72) Inventors: Kenichiro Inagaki, Shiga (JP); Osamu Imahori, Shiga (JP); Tomohiro Yamaguchi, Shiga (JP); Shunsuke Mori, Osaka (JP); Minoru Nagata, Shiga (JP); Mami Kuroda, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 480 days.

(21) Appl. No.: 17/789,925

(22) PCT Filed: Nov. 10, 2020

(86) PCT No.: PCT/JP2020/041832
§ 371 (c)(1),
(2) Date: Jun. 29, 2022

(87) PCT Pub. No.: WO2021/161599
PCT Pub. Date: Aug. 19, 2021

(65) Prior Publication Data
US 2022/0396506 A1 Dec. 15, 2022

(30) Foreign Application Priority Data
Feb. 14, 2020 (JP) .................................. 2020-023377

(51) Int. Cl.
*C25B 9/63* (2021.01)
*C02F 1/461* (2023.01)
(Continued)

(52) U.S. Cl.
CPC ............ *C25B 9/63* (2021.01); *C02F 1/46104* (2013.01); *C02F 1/4672* (2013.01); *C25B 1/13* (2013.01);
(Continued)

(58) Field of Classification Search
CPC .. C25B 9/63; C25B 11/03; C25B 1/13; C25B 9/00; C25B 9/13; C25B 9/15; C25B 9/17;
(Continued)

(56) References Cited

U.S. PATENT DOCUMENTS 4,493,759 A * 1/1985 Boulton .................... C25B 9/00
204/252
6,156,166 A * 12/2000 Koganezawa ............ C25B 1/13
204/266
(Continued)

FOREIGN PATENT DOCUMENTS

| JP | 2017-176993 A | 10/2017 |
|---|---|---|
| JP | 2018-012105 A | 1/2018 |

(Continued)

OTHER PUBLICATIONS

International Search Report issued on Jan. 19, 2021 in International Application No. PCT/JP2020/041832, with English translation.
(Continued)

*Primary Examiner* — Luan V Van
*Assistant Examiner* — Alexander R. Parent
(74) *Attorney, Agent, or Firm* — Rimon P.C.

(57) ABSTRACT

An electrolytic liquid generation device includes a stacked body in which a conductive membrane is interposed between a cathode and an anode constituting electrodes, an electrolytic part that electrolyzes a liquid, and a housing in which the electrolytic part is disposed. The housing includes a flow path in which a liquid flowing direction intersects a stacking direction of the stacked body. The electrolytic part
(Continued)

includes a slot open to the flow path in which a part of the interface between the conductive membrane and the electrode is exposed. In the housing, a positioning member is disposed, and the positioning member positions the electrode.

16 Claims, 12 Drawing Sheets

(51) Int. Cl.
    *C02F 1/467*     (2023.01)
    *C25B 1/13*     (2006.01)
    *C25B 9/15*     (2021.01)
    *C25B 9/23*     (2021.01)
    *C25B 11/03*     (2021.01)
    *C25B 11/083*     (2021.01)

(52) U.S. Cl.
    CPC .................. *C25B 9/15* (2021.01); *C25B 9/23* (2021.01); *C25B 11/03* (2013.01); *C25B 11/083* (2021.01); *C02F 2001/46147* (2013.01); *C02F 2001/46157* (2013.01); *C02F 2201/46115* (2013.01); *C02F 2201/782* (2013.01); *C02F 2307/12* (2013.01)

(58) Field of Classification Search
    CPC .... C25B 9/19; C25B 9/23; C25B 9/30; C25B 9/70; C25B 9/73; C25B 9/75; C25B 9/77; C02F 1/46104; C02F 2001/46157; C02F 2307/12

USPC .................................................. 204/282, 283
See application file for complete search history.

(56) References Cited

U.S. PATENT DOCUMENTS

| | | | |
|---|---|---|---|
| 9,487,870 B2* | 11/2016 | Limback | C25B 9/17 |
| 10,843,943 B2* | 11/2020 | Inagaki | C02F 1/4672 |
| 11,299,812 B2* | 4/2022 | Inagaki | C25B 1/13 |
| 2017/0174539 A1* | 6/2017 | Inagaki | C02F 1/4672 |
| 2019/0055144 A1* | 2/2019 | Inagaki | C02F 1/46114 |
| 2019/0226100 A1* | 7/2019 | Kawanishi | C25B 1/46 |
| 2020/0017983 A1 | 1/2020 | Yamaguchi et al. | |
| 2020/0017984 A1 | 1/2020 | Inagaki et al. | |
| 2022/0380915 A1* | 12/2022 | Tanaka | C25B 9/19 |

FOREIGN PATENT DOCUMENTS

| | | | | |
|---|---|---|---|---|
| JP | 2020-011176 A | 1/2020 | | |
| JP | 2020-011177 A | 1/2020 | | |
| JP | 2020-011178 A | 1/2020 | | |
| JP | 2020-011180 A | 1/2020 | | |
| KR | 20120109089 A * | 10/2012 | .......... | C02F 1/46104 |
| WO | 2014/141587 A1 | 9/2014 | | |
| WO | WO-2017168475 A1 * | 10/2017 | .......... | C02F 1/46104 |
| WO | WO-2021085334 A1 * | 5/2021 | ............... | C25B 9/00 |

OTHER PUBLICATIONS

The EPC Office Action dated Nov. 13, 2024 for the related European Patent Application No. 20918153.6.

\* cited by examiner

ELECTROLYTIC SOLUTION GENERATION DEVICE

CROSS-REFERENCE OF RELATED APPLICATIONS

This application is the U.S. National Phase under 35 U.S.C. § 371 of International Patent Application No. PCT/JP2020/041832, filed on Nov. 10, 2020, which in turn claims the benefit of Japanese Patent Application No. 2020-023377, filed on Feb. 14, 2020, the entire disclosures of which Applications are incorporated by reference herein.

TECHNICAL FIELD

The present disclosure relates to an electrolytic liquid generation device.

BACKGROUND ART

A conventionally known electrolytic liquid generation device includes an electrolytic part that electrolyzes a liquid and a housing in which the electrolytic part is disposed (see, for example, PTL 1). The electrolytic part includes a stacked body including electrodes adjacent to each other and a conductive membrane interposed between the electrodes.

The electrolytic liquid generation device has an inlet port through which a liquid to be supplied to the electrolytic part flows in and an outlet port through which an electrolytic liquid generated in the electrolytic part flows out, the inlet port and the outlet port being provided in the housing. The housing has a flow path in which a liquid flowing direction of the liquid formed inside intersects a stacking direction of the stacked body. The electrolytic part has a slot that is open to the flow path and that is formed in such a manner that at least a part of interfaces between the conductive membrane and the respective electrodes is exposed. The electrodes adjacent to each other constitute a cathode and an anode.

The electrolytic liquid generation device electrolyzes water as the liquid supplied to the electrolytic part with an application of voltage to the electrolytic part to generate ozone as an electrolytic product. The electrolytic liquid generation device dissolves the generated ozone in water to obtain ozone water as an electrolytic liquid.

In the electrolytic liquid generation device of PTL 1, outer edges of the electrodes constituting the stacked body are in contact with the inner face of the housing. This allows the electrodes to be positioned with respect to the housing.

However, when the electrodes are positioned with respect to the housing as described above, downsized electrodes cannot contact with the inner face of the housing at its outer edge. Therefore, it is not possible to achieve both the downsizing and positioning of the electrodes.

CITATION LIST

Patent Literature

PTL 1: Unexamined Japanese Patent Publication No. 2017-176993

SUMMARY OF THE INVENTION

The present disclosure provides an electrolytic liquid generation device in which electrodes can be downsized and positioned with respect to a housing.

The electrolytic liquid generation device of the present disclosure includes a stacked body, the stacked body including a cathode and an anode constituting electrodes adjacent to each other and a conductive membrane interposed between the cathode and the anode, an electrolytic part that electrolyzes a liquid, and a housing in which the electrolytic part is disposed. The housing includes an inlet port through which a liquid to be supplied to the electrolytic part flows in, an outlet port through which an electrolytic liquid generated in the electrolytic part flows out, and a flow path in which a liquid flowing direction intersects a stacking direction of the stacked body. The electrolytic part includes a slot that is open to the flow path and is formed in such a manner that at least a part of interfaces between the conductive membrane and the respective electrodes is exposed. In the housing, a positioning member is disposed with respect to the housing, and the positioning member is configured to position at least either one electrode of the cathode and the anode.

The present disclosure can provide an electrolytic liquid generation device in which electrodes can be downsized, and the electrodes can be positioned with respect to a housing.

DESCRIPTION OF EMBODIMENT

Figure 1:
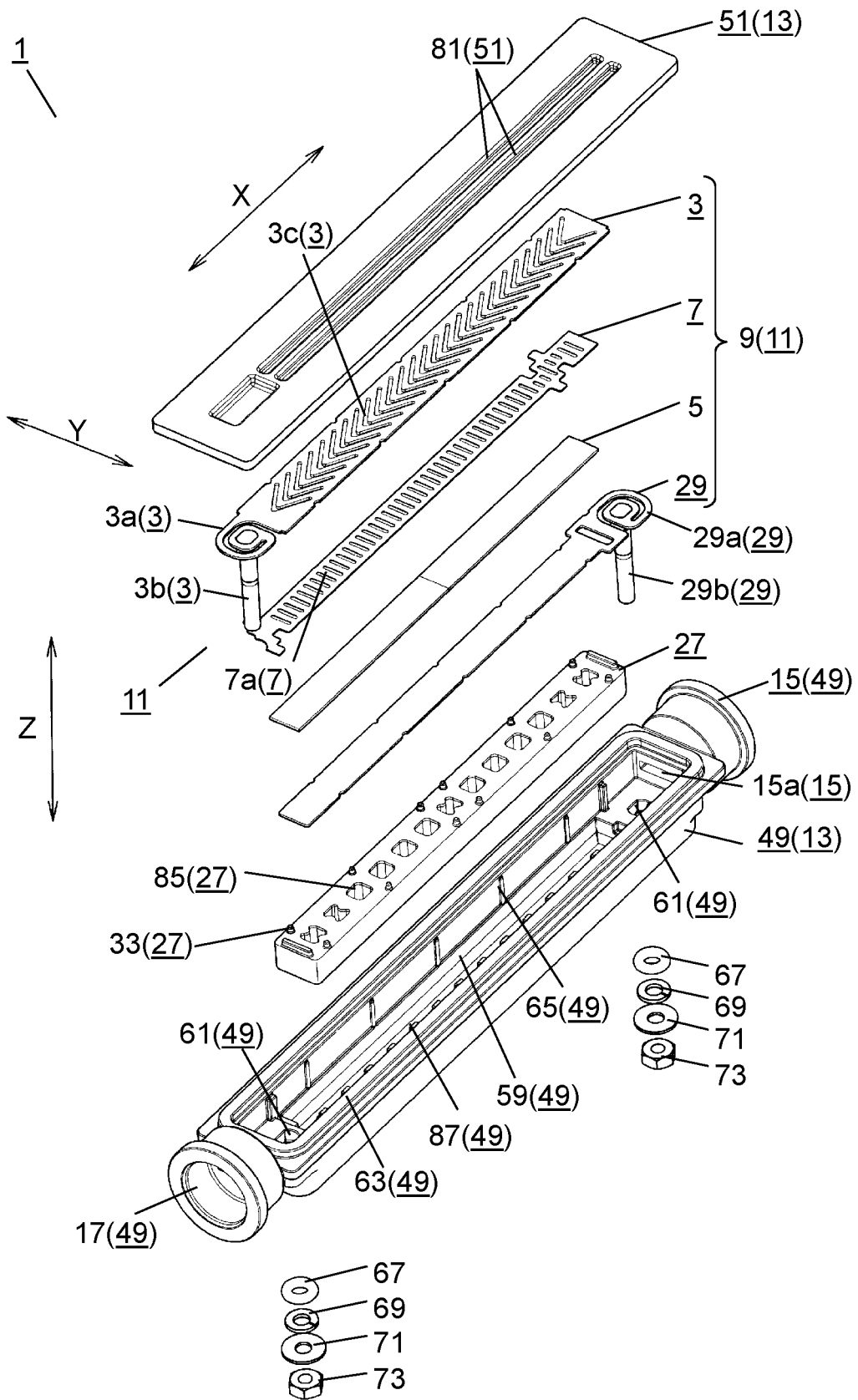
FIG. 1 is an exploded perspective view of an electrolytic liquid generation device according to a first exemplary embodiment.

An exemplary embodiment is described below in detail with reference to the drawings. Unnecessarily detailed descriptions may be omitted. For example, detailed descriptions of already well-known matters and redundant descriptions of substantially the same configurations may be omitted.

The accompanying drawings and the following description are only presented to help those skilled in the art fully understand the present disclosure and are not intended to limit the subject matters described in the claims.

Hereinafter, an ozone water generator is described as an example of the electrolytic liquid generation device. The ozone water generator generates ozone as an electrolytic product and dissolves ozone in water as a liquid to generate ozone water as an electrolytic liquid. The ozone water has advantages such as non-persistence and the generation of no by-product and is effective for sterilization and decomposition of organic substances. Therefore, the ozone water is widely used in water treatment, food, and medical fields.

In the following description, an extending direction of a flow path is referred to as liquid flowing direction (flowing direction of a liquid) X, a width direction of the flow path is referred to as width direction (direction crossing the liquid flowing direction) Y, and a direction in which electrodes and a conductive membrane are stacked is referred to as stacking direction Z. In the present exemplary embodiment, stacking direction Z is defined as a vertical direction, and the side of an electrode case lid of the housing is defined as an upper side.

Further, description is made below while referring, as specific examples, ozone as an electrolytic product, water as a liquid, and ozone water as an electrolytic liquid.

First Exemplary Embodiment

Hereinafter, electrolytic liquid generation device 1 according to a first exemplary embodiment of the present disclosure will be described with reference to FIGS. 1 to 10.

As illustrated in FIGS. 1 to 10, electrolytic liquid generation device 1 of the first exemplary embodiment includes electrolytic part 11, housing 13, positioning member 27, and the like.

As illustrated in FIGS. 1 to 4, electrolytic part 11 includes stacked body 9. Stacked body 9 includes cathode 3 and anode 5 constituting adjacent electrodes, conductive membrane 7, power feeder 29, and the like. Hereinafter, in the case of not distinguishing cathode 3 and anode 5 from each other, these two may be simply described as "electrodes".

Cathode 3 is formed using, for example, titanium. Cathode 3 is formed in, for example, a rectangular plate shape with liquid flowing direction X as the longer direction, width direction Y as the shorter direction, and stacking direction Z as the thickness direction. Cathode 3 is electrically connected to power-feeding shaft 3b for cathode at one end in the longer direction (downstream side in liquid flowing direction X) via spiral spring 3a. Power-feeding shaft 3b is electrically connected to a negative electrode of a power supply part (not illustrated).

Cathode 3 has a plurality of cathode holes 3c formed by penetrating in the thickness direction (stacking direction Z). Each of the plurality of cathode holes 3c is formed in a substantially identical (including identical) shape such as a V shape toward the longer direction (liquid flowing direction X). The plurality of cathode holes 3c are provided so as to be aligned in a row at a predetermined pitch along the longer direction (liquid flowing direction X). The shape and arrangement of cathode holes 3c are not limited to the above form and may be in another form such as a linear shape. It is sufficient that at least one cathode hole 3c is formed in cathode 3.

Anode 5 is formed by, for example, forming a conductive diamond membrane on a conductive substrate formed using silicon. The conductive diamond membrane has conductivity by being doped with boron and is formed on the conductive substrate by a plasma chemical vapor deposition (CVD) method. Anode 5 is formed in, for example, a rectangular plate shape with liquid flowing direction X as the longer direction, width direction Y as the shorter direction, and stacking direction Z as the thickness direction. Two anodes 5 are aligned along the longer direction (liquid flowing direction X). Anodes 5 are stacked with cathode 3 with conductive membrane 7 interposed between the anodes and the cathode in stacking direction Z.

Conductive membrane 7 of stacked body 9 is formed using, for example, a proton conductive type ion exchange film. Conductive membrane 7 is formed in, for example, a rectangular plate shape with liquid flowing direction X as the longer direction, width direction Y as the shorter direction, and stacking direction Z as the thickness direction. Conductive membrane 7 has a plurality of conductive membrane holes 7a formed by penetrating in the thickness direction (stacking direction Z).

Each of the plurality of conductive membrane holes 7a is formed in a substantially identical (including identical) shape such as a long hole shape along the shorter direction (width direction Y). That is, the plurality of conductive membrane holes 7a are provided so as to be aligned in a row at a predetermined pitch along the longer direction (liquid flowing direction X). The pitch of the plurality of conductive membrane holes 7a may be the same as the pitch of cathode holes 3c, or may be different from the pitch of cathode holes 3c. The shape and arrangement of conductive membrane holes 7a are not limited to the above form and may be in another form such as a V shape. It is sufficient that at least one conductive membrane hole 7a is formed in conductive membrane 7.

Power feeder 29 is formed using, for example, titanium. Power feeder 29 is formed in, for example, a rectangular plate shape with liquid flowing direction X as the longer direction, width direction Y as the shorter direction, and stacking direction Z as the thickness direction. Power feeder 29 is electrically connected to power-feeding shaft 29b for anode at the other end in the longer direction (upstream side in liquid flowing direction X) via spiral spring 29a. Power-feeding shaft 29b is electrically connected to a positive electrode of the power supply part (not illustrated). Power feeder 29 is stacked on one face side of anode 5 in stacking direction Z and is disposed in contact with anode 5. This causes power feeder 29 to be electrically connected to anode 5.

That is, in stacked body 9 of the present exemplary embodiment, power feeder 29, anode 5, conductive membrane 7, and cathode 3 are stacked in this order from the lower side in stacking direction Z. In stacked body 9, at a part of conductive membrane 7 stacked between cathode 3 and anode 5, interface 21 is formed between cathode 3 and conductive membrane 7, and interface 23 is formed between anode 5 and conductive membrane 7. In a part of stacked body 9 where cathode 3 and conductive membrane 7 are stacked, cathode holes 3c and conductive membrane holes 7a communicate with each other in stacking direction Z. Conductive membrane 7, cathode hole 3c, and conductive membrane hole 7a form slot 25. At least a part of interface 21 and interface 23 is exposed to slot 25. Further, slot 25 is open to flow path 19 described later through which a liquid such as water flows. This causes water to flow through slot 25.

In electrolytic part 11 having stacked body 9, first, the water flows through flow path 19, and then the water flows through slot 25. When a voltage is applied between cathode 3 and anode 5 by the power supply part in a state where the water is flowing, a potential difference is generated between cathode 3 and anode 5 via conductive membrane 7. This potential difference energizes cathode 3, anode 5, and conductive membrane 7. This causes electrolysis mainly in the water in slot 25 to generate ozone as an electrolytic product near interface 23 between anode 5 and conductive membrane 7. The ozone thus generated dissolves in the water while being carried to the downstream side of flow path 19 along the water flow. As a result, an electrolytic liquid such as ozone water is generated. Electrolytic part 11 described above is disposed in housing 13.

As illustrated in FIGS. 1 to 4, housing 13 of electrolytic liquid generation device 1 is formed using, for example, a non-conductive resin such as polyphenylene sulfide (PPS). Housing 13 includes electrode case 49, electrode case lid 51, and the like.

Electrode case 49 of housing 13 has bottom wall 53 located on the lower side in stacking direction Z and peripheral wall 55. Peripheral wall 55 is erected upward from the peripheral edge of bottom wall 53 in stacking direction Z and is formed continuously in the peripheral direction. That is, electrode case 49 is formed in, for example, a rectangular housing shape in which the upper side of peripheral wall 55 is open. Peripheral wall 55 has flange 57 disposed at an upper end. Flange 57 extends outward in a planar direction parallel to liquid flowing direction X and width direction Y and is formed continuously in the peripheral direction of peripheral wall 55.

Electrode case 49 includes housing recess 59, a pair of through-holes 61, fitting projection 63, inlet port 15, outlet port 17, and the like.

Housing recess 59 is formed in an inner space of electrode case 49 which is open on the upper side of peripheral wall 55 and defined by inner face 53a of bottom wall 53 and inner face 55a of peripheral wall 55. Housing recess 59 houses electrolytic part 11, positioning member 27, and the like from the opening side. Peripheral wall 55 has a plurality of positioning protrusions 65 formed on inner face 55a. Positioning protrusions 65 are formed along liquid flowing direction X and positions cathode 3 of stacked body 9 with respect to housing 13.

The pair of through-holes 61 are respectively provided near ends on the downstream side and the upstream side in liquid flowing direction X of bottom wall 53 of housing recess 59. The pair of through-holes 61 are formed to penetrate bottom wall 53 in stacking direction Z. Power-feeding shaft 3b of cathode 3 and power-feeding shaft 29b of power feeder 29 are respectively inserted into the pair of through-holes 61 in a state where electrolytic part 11 is housed in housing recess 59 of electrode case 49. Below the pair of through-holes 61, O-ring 67, washer 69, spring washer 71, and hex nut 73 are assembled to each of power-feeding shaft 3b and power-feeding shaft 29b that are inserted. This fixes power-feeding shaft 3b and power-feeding shaft 29b to the pair of through-holes 61. In addition, this assembly stops the water inside housing recess 59.

Fitting projection 63 is erected upward from the upper face (for example, from flange 57) of peripheral wall 55 in stacking direction Z and is formed continuously in the peripheral direction. Fitting projection 63 is fitted with fitting recess 79 of electrode case lid 51 described later, and electrode case lid 51 is positioned with respect to electrode case 49. A plurality of fitting projections 63 may be discontinuously formed in the peripheral direction.

Inlet port 15 is provided in peripheral wall 55 of electrode case 49 at a portion located on the upstream side in liquid flowing direction X, and extends in a tubular shape toward the upstream side in liquid flowing direction X. Inlet port 15 is formed with, at the center thereof, hole 15a having a long hole shape penetrating peripheral wall 55 in liquid flowing direction X and communicating with housing recess 59.

Inlet port 15 is connected with a pipe (not illustrated) for supplying water and introduces the water into housing recess 59.

Outlet port 17 is provided in peripheral wall 55 of electrode case 49 at a portion located on the downstream side in liquid flowing direction X, and extends in a tubular shape toward the downstream side in liquid flowing direction X. Outlet port 17 is formed with, at the center thereof, a hole (not illustrated) with a long hole shape penetrating peripheral wall 55 in liquid flowing direction X and communicating with housing recess 59. Outlet port 17 is connected with a pipe (not illustrated) for discharging ozone water and leads out the ozone water generated by electrolytic part 11 in housing recess 59.

Figure 2:
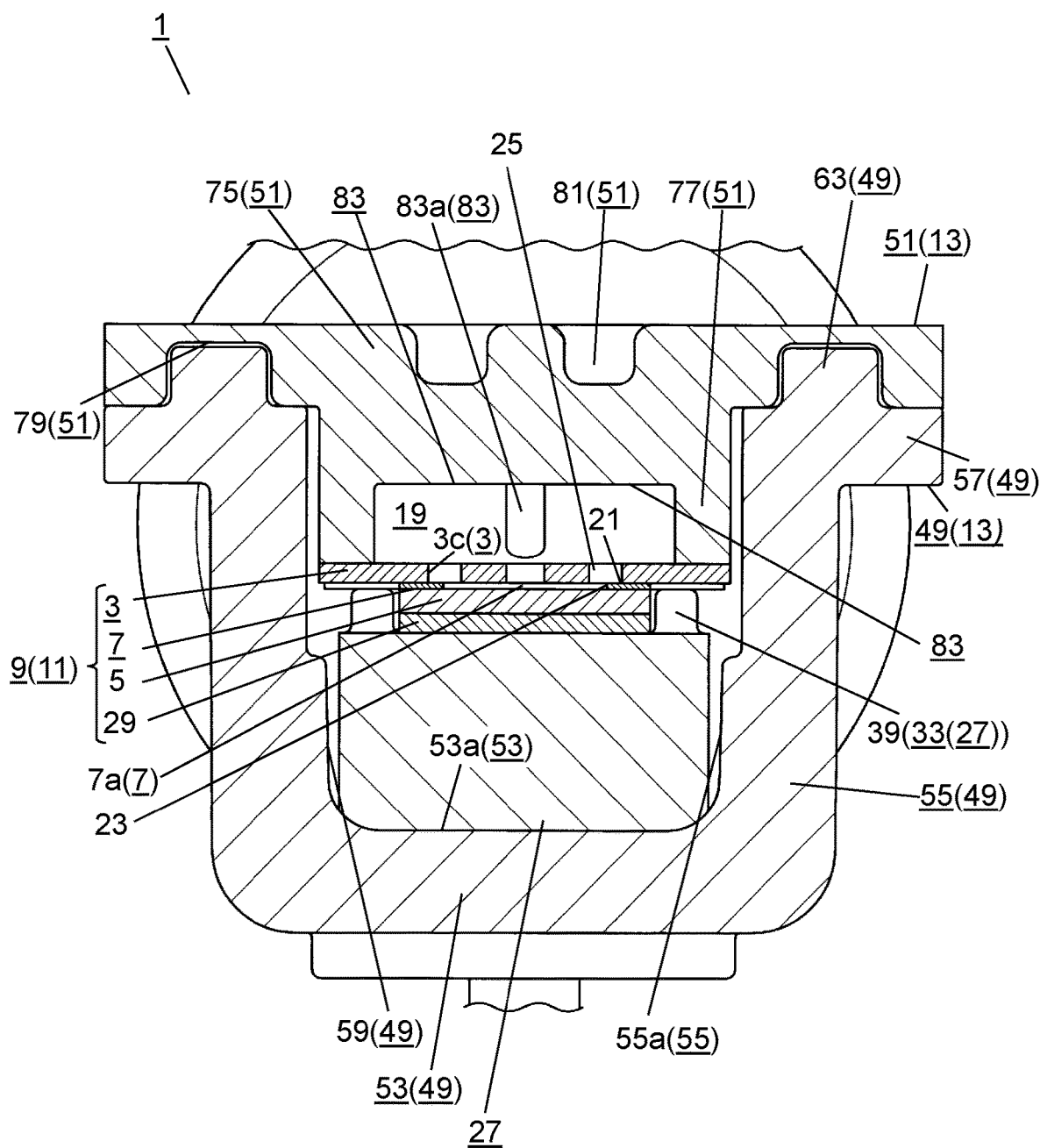
FIG. 2 is a cross-sectional view of the electrolytic liquid generation device according to the exemplary embodiment.
Figure 3:
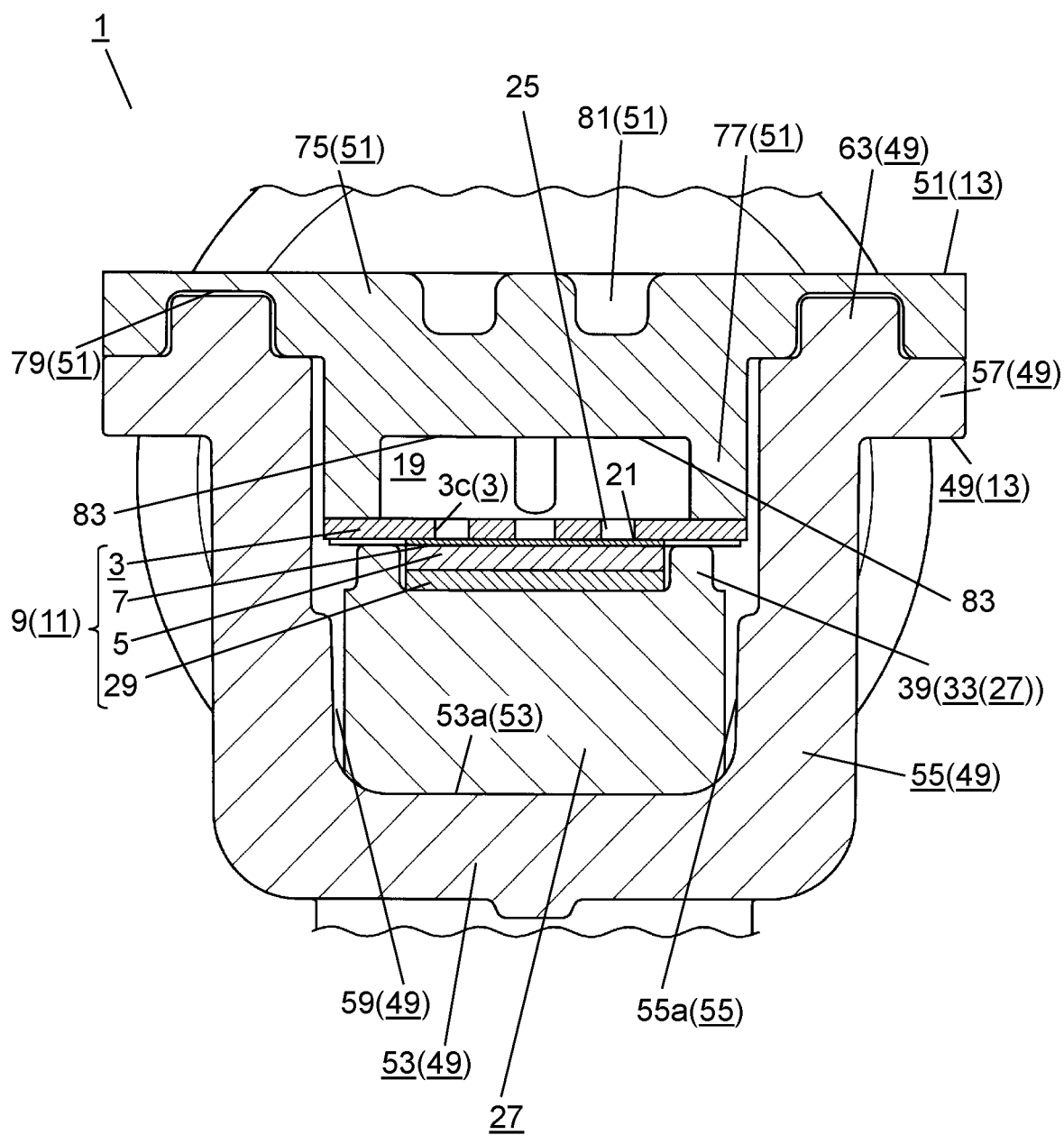
FIG. 3 is a cross-sectional view of the electrolytic liquid generation device according to the exemplary embodiment.
Figure 4:
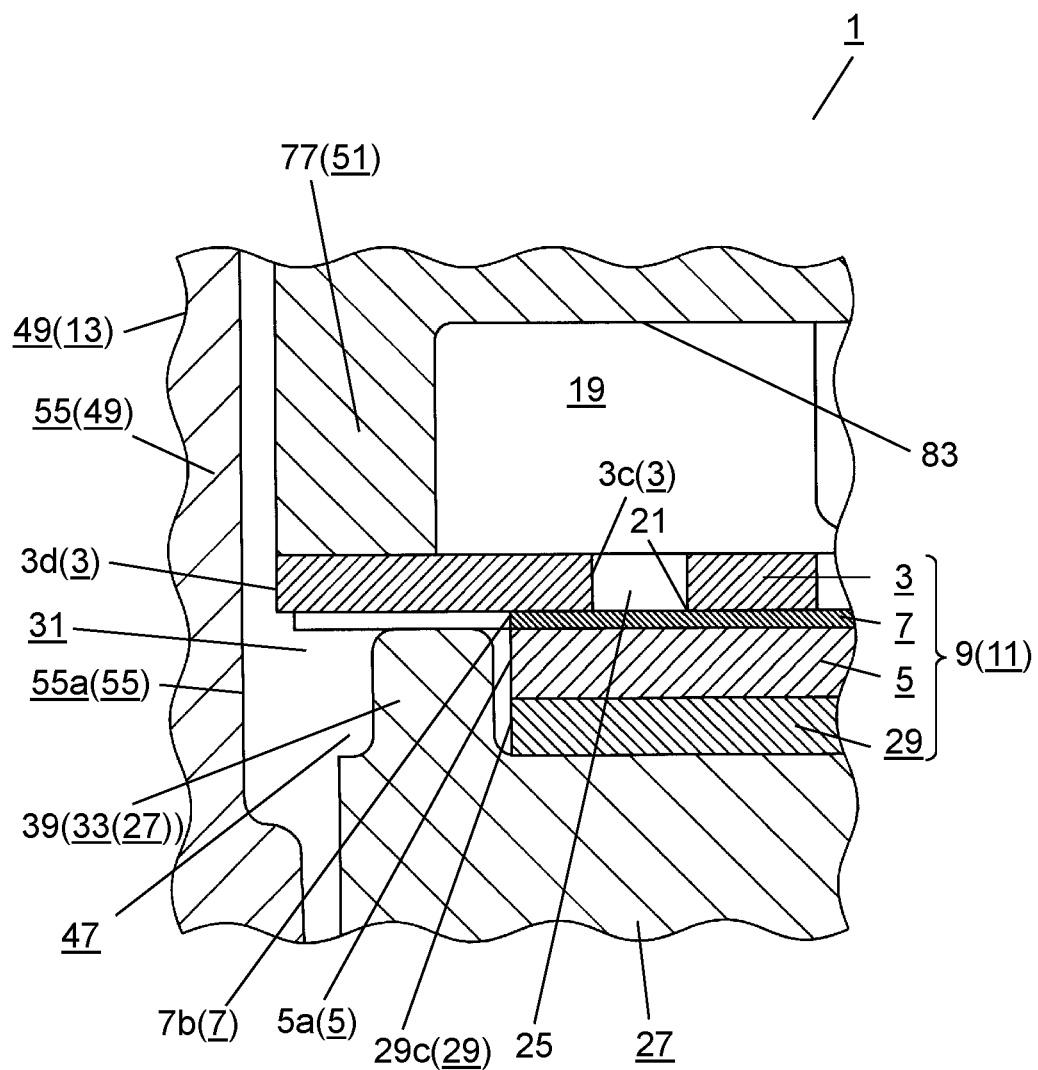
FIG. 4 is an enlarged view of a main part of FIG. 3.
Figure 5:
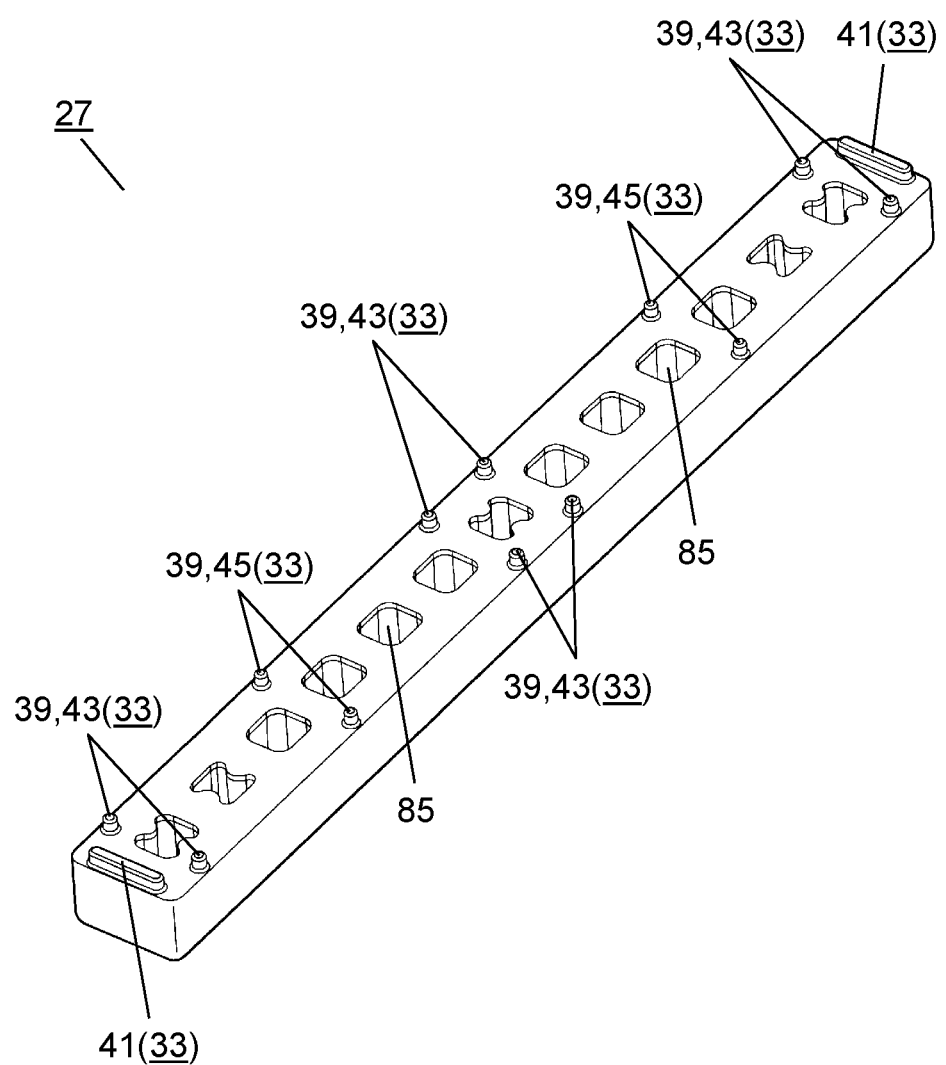
FIG. 5 is a perspective view of a positioning member of the electrolytic liquid generation device according to the exemplary embodiment.
Figure 6:
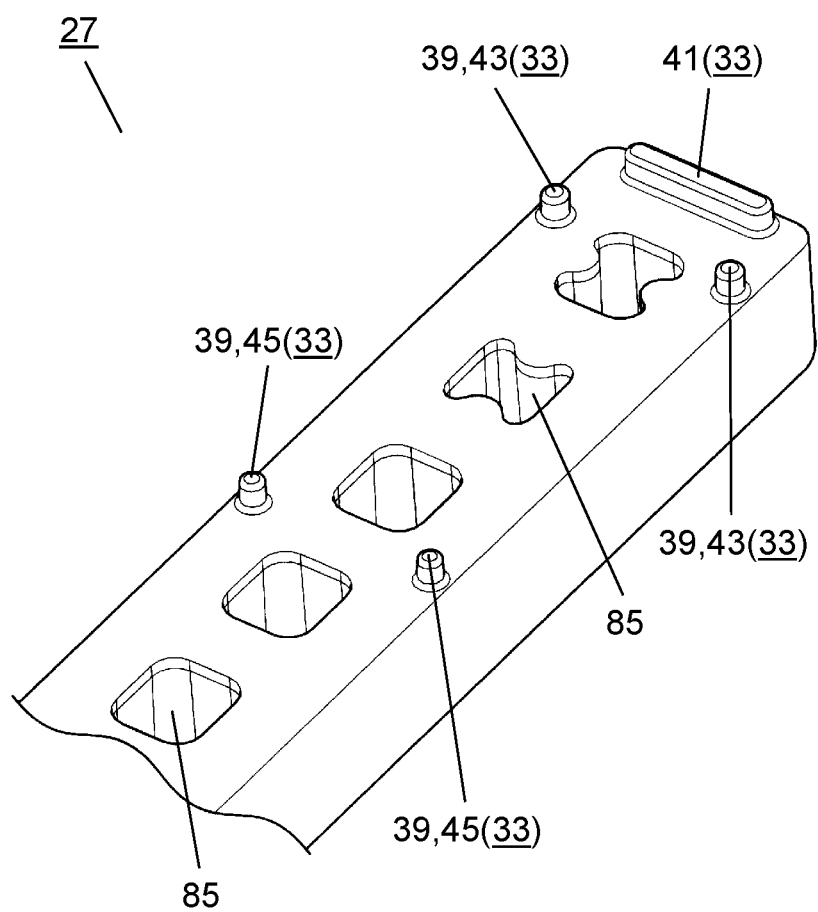
FIG. 6 is an enlarged view of a main part of FIG. 5.

As illustrated in FIGS. 2 to 4, electrode case lid 51 of housing 13 includes lid body 75 in a rectangular shape located on the upper side in stacking direction Z, flow path projection 77 erected downward in a rectangular shape from the lower face of the center of lid body 75 in stacking direction Z, and the like.

Lid body 75 has the outer shape formed to be substantially identical (including identical) to flange 57 of electrode case 49. That is, lid body 75 is configured to be able to close the opening of housing recess 59 of electrode case 49. Lid body 75 has fitting recess 79 that is continuously formed in the peripheral direction near the outer edge of the lower face and can be fitted to fitting projection 63 of electrode case 49. The lower face of lid body 75 is in contact with the upper face of flange 57 of electrode case 49, and the contact surfaces thereof are welded in a state where fitting recess 79 is fitted to fitting projection 63. This welding causes the inside of housing 13 to stop water and fixes electrode case lid 51 to electrode case 49.

The fixing between electrode case 49 and electrode case lid 51 is not limited to the above welding method. For example, a sealing material may be interposed between electrode case 49 and electrode case lid 51, and electrode case 49 and electrode case lid 51 may be fixed by a fixing method such as screwing. In the case where the plurality of fitting projections 63 are discontinuously formed in the peripheral direction, the plurality of fitting recesses 79 may be formed discontinuously in the peripheral direction so as to match with the plurality of fitting projections 63, and the above projections and recesses may be fitted and welded to each other.

Further, lid body 75 has groove 81 formed on the upper face. Groove 81 is used for positioning, catching, reverse insertion prevention, and the like when, for example, electrolytic liquid generation device 1 is assembled to an instrument.

Flow path projection 77 is formed to have an outer shape substantially identical (including identical) to an inner edge of the opening of housing recess 59 of electrode case 49. The dimension of the outer face of flow path projection 77 is set to have a slight gap with inner face 55a of peripheral wall 55. This facilitates insertion of flow path projection 77 into housing recess 59 of electrode case 49.

Flow path projection 77 is inserted into housing recess 59 in a state where electrode case lid 51 is assembled to electrode case 49. This causes the lower face of electrode case lid 51 to contact with the surface of cathode 3 of electrolytic part 11 to press stacked body 9 of electrolytic part 11 downward in stacking direction Z.

Flow path projection 77 includes flow path groove 83 formed at the center of the lower face along liquid flowing direction X.

Flow path groove 83 is defined by a plurality of cylindrical protrusions 83a disposed along liquid flowing direction X at the center of flow path projection 77 in width direction Y. This provides two flow path grooves 83 with respect to width direction Y of flow path projection 77. Flow path grooves 83 are open on the facing cathode 3 side and on both sides in liquid flowing direction X. The width of flow path groove 83 in width direction Y is set substantially equal (including equal) to the width of slot 25 of electrolytic part 11 in width direction Y. With this setting, the water flowing in flow path groove 83 can be stably introduced into slot 25. In the state where flow path projection 77 is in contact with cathode 3, flow path groove 83 described above forms, with the surface of cathode 3, flow path 19 through which the water flows.

That is, the water introduced into housing 13 from inlet port 15 flows into flow path 19. The water flowing into flow path 19 flows through slot 25 of electrolytic part 11 and is electrolyzed, whereby ozone as an electrolytic product is generated. The generated ozone dissolves in the water flowing through flow path 19, whereby ozone water is generated. The generated ozone water flows through flow path 19 and is led out of housing 13 from outlet port 17.

In electrolytic liquid generation device 1 of the first exemplary embodiment, positioning member 27 is disposed in housing 13 in which flow path 19 is formed.

Positioning member 27 illustrated in FIGS. 1 to 10 is constituted using, for example, an elastic body having an elastic force such as rubber, plastic, or a metal spring.

Positioning member 27 is formed in a rectangular parallelepiped shape whose outer face shape is substantially identical (including identical) to the inner face shape of housing recess 59 of electrode case 49 on the side of bottom wall 53 and is configured to be housed in housing recess 59. In the state of being housed in housing recess 59, positioning member 27 has electrolytic part 11 stacked on the upper side in stacking direction Z. Electrode case lid 51 is assembled to electrode case 49 with electrolytic part 11 being stacked. At this time, flow path projection 77 of electrode case lid 51 presses cathode 3 of stacked body 9 of electrolytic part 11 downward in stacking direction Z. This causes positioning member 27 to be pressed downward in stacking direction Z.

At this time, since positioning member 27 is formed of an elastic body, a repulsive force to go back toward the upper side in the stacking direction Z is generated with respect to the pressing. The repulsive force of positioning member 27 applies an upward biasing force in stacking direction Z to electrolytic part 11. This causes stacked body 9 of electrolytic part 11 to be in close contact with flow path projection 77 of electrode case lid 51 in stacking direction Z. Therefore, the contact of stacked body 9 is stabilized, and the energization area is maintained. As a result, the current density supplied to stacked body 9 can be equalized, and the electrolysis performance in electrolytic part 11 can be stabilized. Note that a gap is formed between the outer face of positioning member 27 and the inner face of housing recess 59 in a free state where positioning member 27 is not pressed. This gap allows deformation of positioning member 27 when positioning member 27 is elastically deformed by pressing.

Positioning member 27 further includes a positioning recess 85. A plurality of positioning recesses 85 are formed to penetrate in stacking direction Z along liquid flowing direction X. A plurality of positioning projections 87 erected from bottom wall 53 of housing recess 59 of electrode case 49 are inserted into positioning recesses 85. Inserting positioning projections 87 into positioning recesses 85 allows positioning member 27 to be positioned with respect to housing 13 in a planar direction parallel to liquid flowing direction X and width direction Y. At this time, in the free state of positioning member 27, a gap that allows deformation of positioning member 27 is formed between the inner face of positioning recess 85 and the outer face of positioning projection 87. This gap allows deformation of positioning member 27 similarly to the gap described above. Positioning recess 85 may be formed in a concave shape instead of the penetrating shape through which positioning member 27 penetrates in stacking direction Z.

As described above, in electrolytic liquid generation device 1 of the first exemplary embodiment, the width of cathode 3 of stacked body 9 of electrolytic part 11 in width direction Y is set to be substantially equal (including equal) to the width of flow path projection 77 of electrode case lid 51 in width direction Y. This setting of the width of cathode 3 allows the openings of slot 25 formed by cathode holes 3c of cathode 3, conductive membrane holes 7a of conductive membrane 7, and anode 5 with respect to flow path 19 formed between cathode 3 and flow path projection 77 to be stably disposed. Further, flow path projection 77 can stably press cathode 3 of electrolytic part 11 downward in stacking direction Z.

The width of anode 5 of stacked body 9 in width direction Y is set to be narrower than the width of cathode 3 in width direction Y and substantially equal (including equal) to the width of conductive membrane 7 in width direction Y. The setting of the widths of anode 5 and conductive membrane 7 as described above can downsize expensive anode 5 and conductive membrane 7, which can reduce the cost.

The width of power feeder 29 of stacked body 9 in width direction Y is set to be substantially equal (including equal) to the width of anode 5 in width direction Y. This setting of the width of power feeder 29 can secure the energization area for anode 5 while downsizing power feeder 29. Therefore, energization to anode 5 can be stabilized, and the electrolysis performance in electrolytic part 11 can be maintained.

The width of positioning member 27 in width direction Y is set to be wider than the widths of anode 5 and power feeder 29 of stacked body 9 in width direction Y. This setting of the width of positioning member 27 allows an outer edge of positioning member 27 to be disposed on the outer peripheries of anode 5 and power feeder 29. In addition, positioning member 27 can stably receive the pressing force applied to power feeder 29 from flow path projection 77 of electrode case lid 51. Therefore, the biasing force can be stably applied to stacked body 9 of electrolytic part 11.

In electrolytic liquid generation device 1, when a minute gap is formed between the outer periphery of electrolytic part 11 and the inner face of housing 13, there is a case of a liquid such as water entering and remaining in the minute gap. When ozone is generated by electrolyzing water in the state where water remains around electrolytic part 11, the pH value of the water retaining around electrolytic part 11 increases. As a result, scale mainly composed of a calcium component is likely to be generated around electrolytic part 11. When the scale is generated, the scale possibly accumulates in the minute gap. When the scale is accumulated around electrolytic part 11, there is a risk that electrolytic part 11 and housing 13 are deformed by being compressed by the scale.

Accordingly, as illustrated in FIG. 4, in electrolytic liquid generation device 1 of the first exemplary embodiment, space 31 for inhibiting water from remaining is formed between the outer periphery of electrolytic part 11 and the inner face of housing 13.

That is, space 31 is formed between inner face 55a of peripheral wall 55 and the side faces of stacked body 9 on both sides in width direction Y. Specifically, space 31 is formed between inner face 55a of peripheral wall 55 and each of side face 3d of cathode 3, side face 5a of anode 5, side face 7b of conductive membrane 7, and side face 29c of power feeder 29.

Space 31 is formed inside housing 13 along liquid flowing direction X on both sides of stacked body 9 in width direction Y and communicates with inlet port 15 and outlet port 17. This causes the water introduced from inlet port 15 to flow through space 31 and to be led out from outlet port 17. Therefore, the water is inhibited from remaining around electrolytic part 11. Inhibiting water from remaining around electrolytic part 11 inhibits generation or accumulation of scale around electrolytic part 11. As a result, deformation of electrolytic part 11 and housing 13 caused by accumulation of scale can be inhibited with increased reliability. Space 31 may be configured to communicate with the middle of flow path 19. This can inhibit deformation of the electrolytic part and the housing caused by accumulation of scale. As a result, it is possible to equalize the current density to stabilize the capacity of the electrolytic part to generate the electrolytic product.

That is, in electrolytic liquid generation device 1 in which space 31 is formed, the width of anode 5 in width direction Y is formed narrower than the width of cathode 3 in width direction Y in electrolytic part 11. Narrowing the width of anode 5 can downsize anode 5. However, downsizing anode 5 may prevent anode 5 from being directly positioned with respect to housing 13.

Therefore, in electrolytic liquid generation device 1 of the first exemplary embodiment, as described above, positioning member 27 positioned with respect to housing 13 positions at least anode 5 in stacked body 9 of electrolytic part 11. That is, anode 5 is positioned in electrode case 49 of housing 13 via positioning member 27. This allows anode 5 to be positioned with respect to housing 13 with increased reliability even when anode 5 is downsized.

Further, as illustrated in FIGS. 1 to 10, positioning member 27 of the first exemplary embodiment includes, at the peripheral edge of the upper face, the plurality of protrusions 33 erected to project upward from the upper face in stacking direction Z. The height of the plurality of protrusions 33 in stacking direction Z is set to be substantially equal (including equal) to the total thickness of power feeder 29 and anode 5 so as to reach the height position of anode 5 of stacked body 9 stacked on positioning member 27. This allows anode 5 to be positioned by the plurality of protrusions 33. The plurality of protrusions 33 include first protrusion 39, second protrusion 41, third protrusion 43, guide part 45, and the like, which are expressed by different names according to arrangement position, purpose, and the like. When first protrusion 39, second protrusion 41, third protrusion 43, and the guide part 45 are collectively mentioned, they will be simply referred to as "protrusions 33".

A plurality of first protrusions 39 are disposed on both sides of the upper face of positioning member 27 in width direction Y (shorter direction) along liquid flowing direction X (longer direction). First protrusions 39 are disposed so as to face side faces 5a, 29c of anode 5 and power feeder 29 on both sides in width direction Y. Therefore, when anode 5 and power feeder 29 try to move in width direction Y, side faces 5a, 29c of anode 5 and power feeder 29 come into contact with first protrusions 39. This restricts movement of anode 5 and power feeder 29 in width direction Y. That is, first protrusions 39 position anode 5 and power feeder 29 with respect to width direction Y.

With first protrusion 39, the movement of anode 5 and power feeder 29 in width direction Y can be prevented, and the above-described space 31 can be stably maintained. Further, contact between anode 5 and power feeder 29 can be stabilized. Therefore, electrolysis performance of electrolytic part 11 can be stably maintained.

First protrusion 39 is formed in a cylindrical shape. This can reduce the contact surface between side face 5a of anode 5 and side face 29c of power feeder 29 and first protrusion 39 and can increase space 31. In addition, contact resistance between first protrusion 39 and anode 5 and power feeder 29 can decrease. Therefore, the assemblability of anode 5 and power feeder 29 to positioning member 27 can improve.

Figure 7:
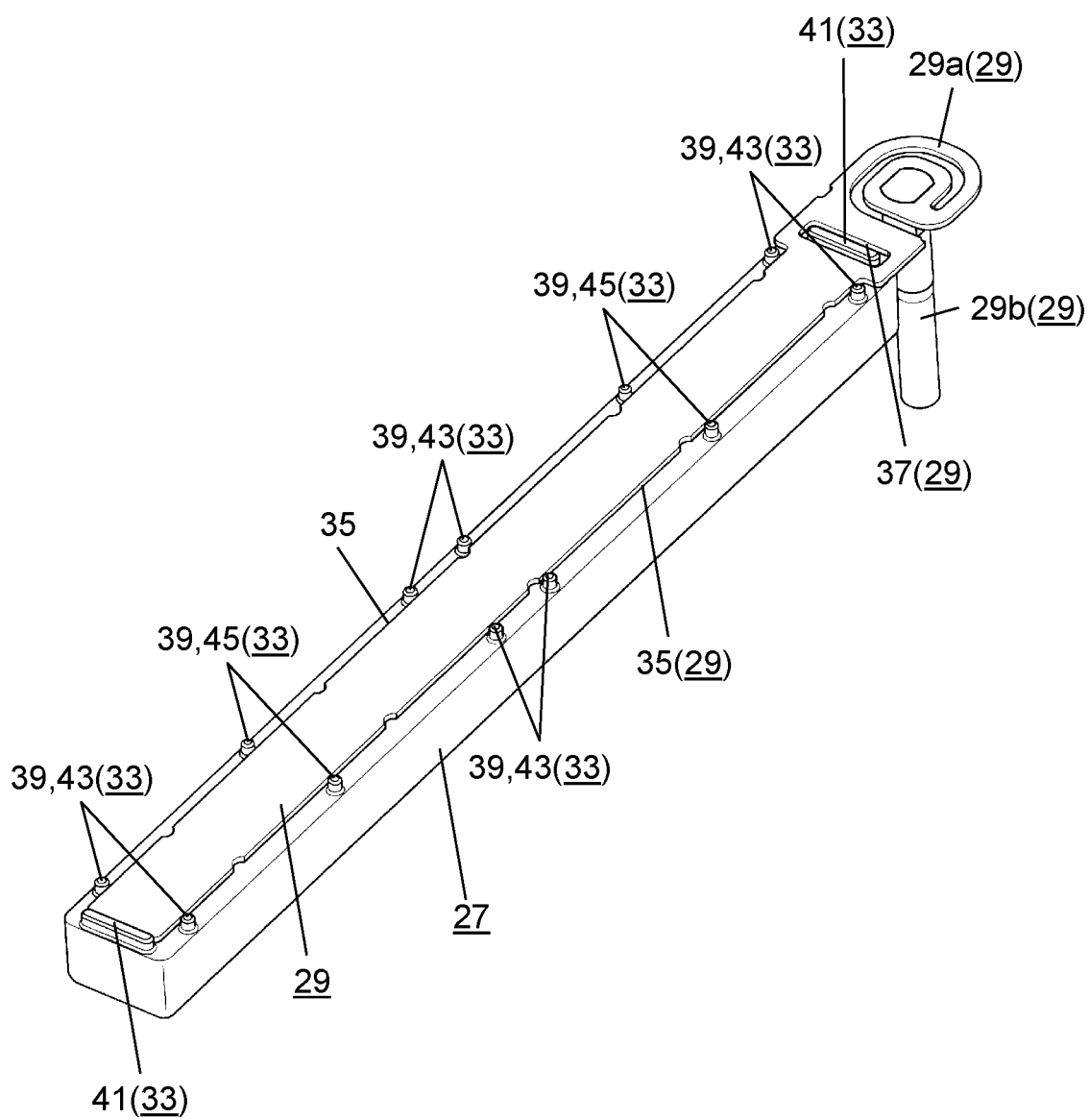
FIG. 7 is a perspective view of the electrolytic liquid generation device according to the exemplary embodiment when a power feeder is assembled to the positioning member.
Figure 8:
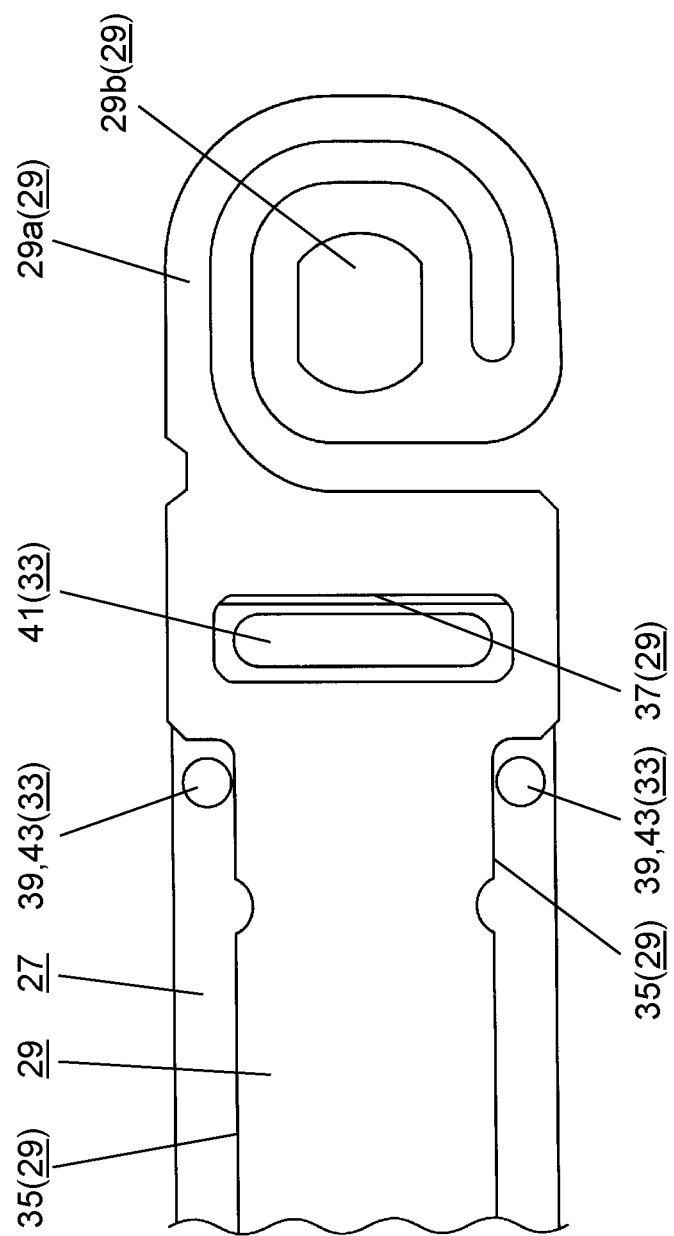
FIG. 8 is an enlarged top view of a main part of FIG. 7.

As illustrated in FIGS. 7 and 8, power feeder 29 includes avoidance part 35 that is provided at a facing part of power feeder 29 where first protrusion 39 is disposed and continuously formed along liquid flowing direction X. Avoidance part 35 avoids contact between first protrusion 39 and power feeder 29 in stacking direction Z. The width of avoidance part 35 in width direction Y is formed to be narrower than the width of power feeder 29 on the power-feeding shaft 29b side in width direction Y and substantially equal (including equal) to the width of anode 5 in width direction Y. This allows anode 5 to be positioned in stacking direction Z by first protrusion 39 without interference between power feeder 29 and first protrusion 39.

Second protrusion 41 is disposed on both sides of the upper face of positioning member 27 in liquid flowing direction X (longer direction). Second protrusion 41 is disposed to face both side faces of anode 5 and power feeder 29 of stacked body 9 in liquid flowing direction X. Therefore, when anode 5 and power feeder 29 try to move in liquid flowing direction X, anode 5 and power feeder 29 come into contact with second protrusion 41. This restricts movement of anode 5 and power feeder 29 in liquid flowing direction X. That is, second protrusion 41 positions anode 5 and power feeder 29 with respect to liquid flowing direction X.

As described above, second protrusion 41 restricts the movement of anode 5 and power feeder 29 in liquid flowing direction X. This stabilizes contact between anode 5 and power feeder 29 constituting stacked body 9. As a result, high electrolysis performance can be maintained in electrolytic part 11. Second protrusion 41 is disposed on both sides in liquid flowing direction X. Therefore, when stacked body 9 is assembled to positioning member 27, second protrusion 41 can be used as a guide of the assembly position. As a result, assemblability of stacked body 9 to positioning member 27 can improve.

Second protrusion 41 is formed in a rectangular prism shape with width direction Y as a longer direction. The rectangular prismatic shape allows anode 5 and power feeder 29 to be stably positioned with respect to liquid flowing direction X using one second protrusion 41 disposed on both sides in liquid flowing direction X.

As illustrated in FIGS. 7 to 10, power feeder 29 includes avoidance part 37. Specifically, avoidance part 37 is provided in a part on the power-feeding shaft 29b side where second protrusion 41 is disposed, and avoids contact with second protrusion 41 in stacking direction Z. Avoidance part 37 penetrates power feeder 29 in stacking direction Z (thickness direction) and is formed in a rectangular hole shape having an inner diameter larger than the outer diameter of second protrusion 41. Second protrusion 41 of positioning member 27 is inserted and disposed in avoidance part 37. This allows anode 5 to be positioned in stacking direction Z by second protrusion 41 while avoiding interference between power feeder 29 and second protrusion 41. In addition, avoidance part 37 in a hole shape can maintain the rigidity of power feeder 29 higher than, for example, the case of an avoidance part on one line that connects the centers of power feeder 29 in the shorter direction.

Figure 9:
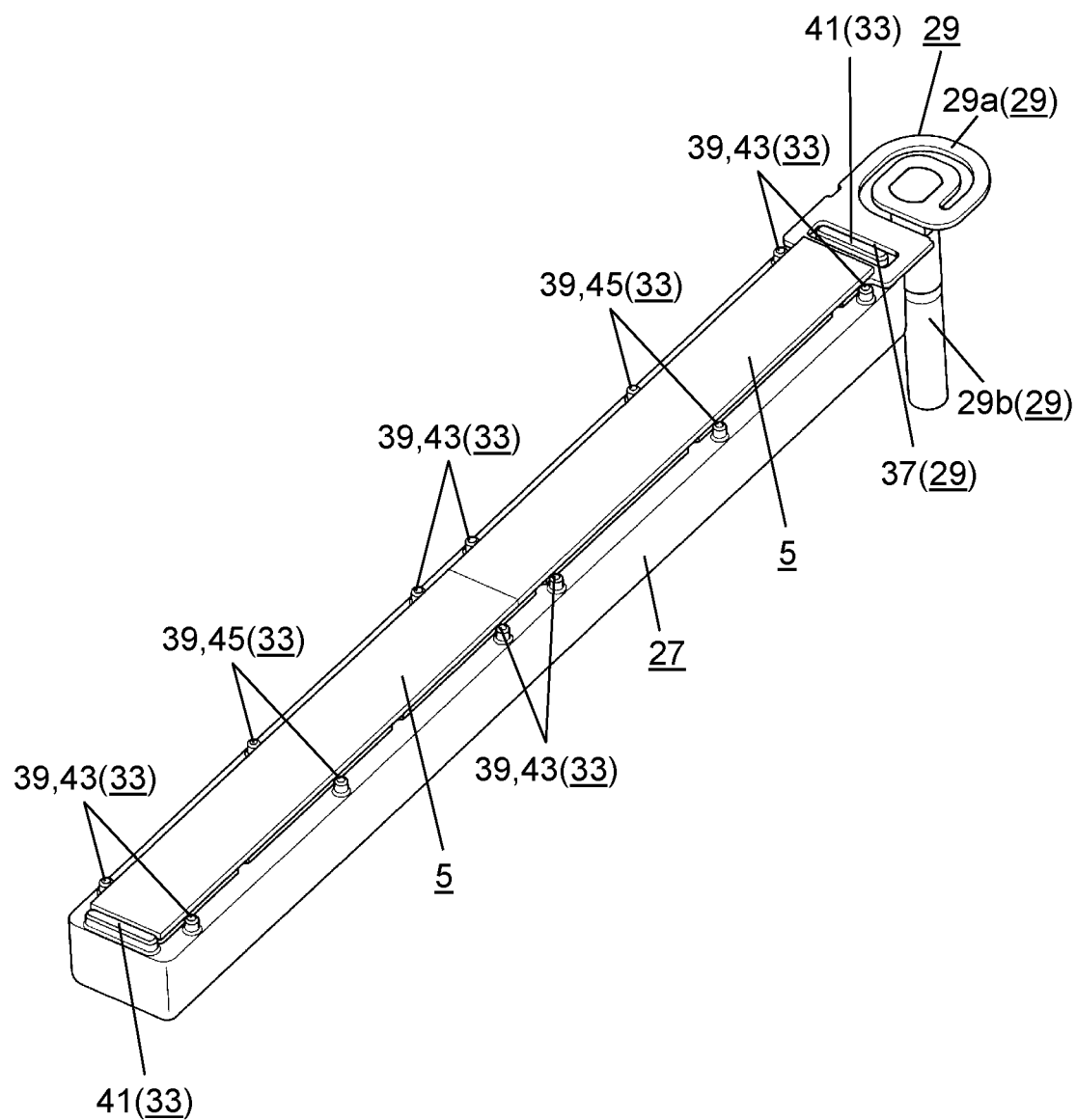
FIG. 9 is a perspective view of the electrolytic liquid generation device according to the exemplary embodiment when a power feeder and an anode are assembled to the positioning member.
Figure 10:
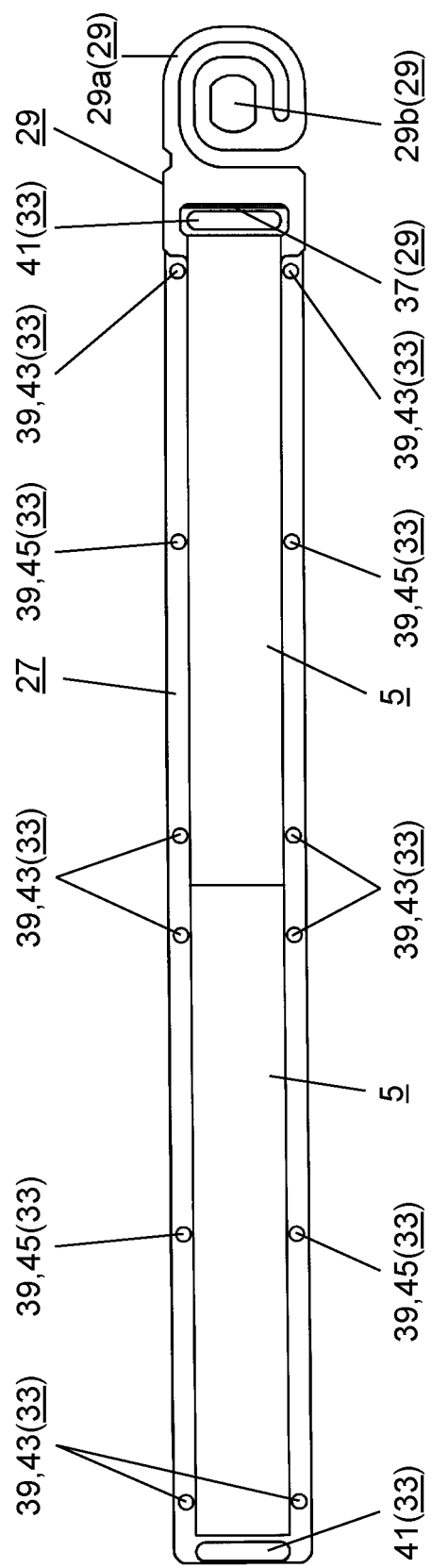
FIG. 10 is a top view of FIG. 9.

Third protrusion 43 is also used as first protrusion 39, and as illustrated in FIG. 9, is disposed near each corner of two rectangular anodes 5 arranged along liquid flowing direction X. Third protrusion 43 positions anode 5 and power feeder 29 with respect to width direction Y. Third protrusion 43 prevents rotation of each anode 5 in a plane formed in liquid flowing direction X and width direction Y. Third protrusion 43 stably inhibits displacement of anode 5 in the planar direction parallel to liquid flowing direction X and width direction Y. This can stably maintain the energization area between anode 5 and power feeder 29 and equalize the conduction density. As a result, the electrolysis performance in electrolytic part 11 can be stably maintained.

Guide part 45 is disposed near the center between the corners of each of two rectangular anode 5 arranged along liquid flowing direction X. Guide part 45 is also used as first protrusion 39 to position anode 5 and power feeder 29 with respect to width direction Y. Anode 5 and power feeder 29 may be positioned with respect to liquid flowing direction X by guide part 45 also as second protrusion 41. When stacked body 9 is assembled to positioning member 27, guide part 45 can be used as a guide for the assembly position. As a result, assemblability of stacked body 9 to positioning member 27 can improve.

In positioning member 27 provided with the plurality of protrusion 33 described above, as illustrated in FIG. 4, a gap 47 is formed between the plurality of protrusions 33 and the outer edge.

On the upper face of positioning member 27, gap 47 is configured by a space formed between the plurality of first protrusions 39 and the outer edge on both sides in width direction Y of positioning member 27, the space extending in width direction Y. Liquid such as water flowing through the above-described space 31 flows through gap 47. Space 31 can be further widened by gap 47. As a result, accumulation of scale can be prevented with increased reliability. Further, gap 47 can adjust the interval of gap 47 in width direction Y, that is, the position of first protrusions 39 with respect to width direction Y. This makes it possible to easily cope with a change in the size in width direction Y of anode 5 and power feeder 29 of stacked body 9.

On the upper face of positioning member 27, gap 47 may be configured by a space formed at a position between second protrusion 41 of positioning member 27 and the outer edges on both sides of positioning member 27 in liquid flowing direction X, the space extending in liquid flowing direction X. Gap 47 provided in liquid flowing direction X can adjust the interval of gap 47 in liquid flowing direction X, that is, the position of second protrusion 41 with respect to liquid flowing direction X. As a result, it is possible to easily cope with a change in the size in liquid flowing direction X of anode 5 and power feeder 29 of stacked body 9.

In this manner, electrolytic liquid generation device 1 of the first exemplary embodiment includes stacked body 9 in which conductive membrane 7 is stacked so as to be interposed between cathode 3 and anode 5 constituting the electrodes adjacent to each other. Electrolytic liquid generation device 1 further includes electrolytic part 11 that electrolyzes liquid, and housing 13 in which electrolytic part 11 is disposed.

Housing 13 includes inlet port 15 through which the liquid to be supplied to electrolytic part 11 flows in, outlet port 17 through which the electrolytic liquid generated in electrolytic part 11 flows out, and flow path 19 in which liquid flowing direction X intersects stacking direction Z of stacked body 9. Electrolytic part 11 includes slot 25 that is open to flow path 19 and is formed such that at least a part of interface 21 and interface 23 between conductive membrane 7 and cathode 3 and anode 5 constituting the electrodes is exposed. Further, positioning member 27 positioned with respect to housing 13 is disposed inside housing 13, and positioning member 27 is configured to position at least either one electrode of cathode 3 and anode 5.

This configuration enables the electrodes to be positioned with respect to housing 13 via the positioning member 27 with increased reliability even when the electrodes are downsized. That is, it is possible to inhibit occurrence of displacement of electrolytic part 11 in stacked body 9 and to stably maintain the energization area in electrolytic part 11. This can equalize the current density in stacked body 9 and stabilize the capacity of the electrolytic part 11 to generate the electrolytic product.

The stacked body 9 includes power feeder 29 in contact with the electrodes, and power feeder 29 is positioned by positioning member 27. This can inhibit occurrence of displacement of the electrodes and power feeder 29 and stabilize contact between the electrodes and power feeder 29. That is, it is possible to stably maintain the energization area between the electrodes and power feeder 29 and equalize the current density. As a result, it is possible to stabilize the capacity of electrolytic part 11 to generate the electrolytic product.

There is provided space 31 inhibiting water from remaining, the space being formed between the outer periphery of at least either one electrode of cathode 3 and anode 5 and the inner face of housing 13. This can prevent liquid from remaining around electrolytic part 11. That is, generation of scale between electrolytic part 11 and housing 13 can be inhibited. As a result, it is possible to prevent the deformation of electrolytic part 11 and housing 13 caused by accumulation of scale from occurring.

The width of power feeder 29 in the direction (width direction Y) intersecting liquid flowing direction X is substantially equal (including equal) to the width of the electrodes in contact with power feeder 29. This can stably maintain the energization area between the electrodes and power feeder 29 while inhibiting an increase in size of power feeder 29. As a result, it is possible to equalize the current density in electrolytic part 11 and stabilize the capacity of electrolytic part 11 to generate the electrolytic product.

Positioning member 27 includes protrusion 33 that protrudes in stacking direction Z and positions at least one electrode of cathode 3 and anode 5. Power feeder 29 includes avoidance part 35 and avoidance part 37 that avoid contact with protrusion 33 with respect to stacking direction Z. This prevents interference between protrusion 33 and power feeder 29 in stacking direction Z and allows the electrodes to be positioned by protrusion 33. Therefore, the electrodes and power feeder 29 can be stably brought into contact with each other. As a result, it is possible to stably maintain the energization area between the electrodes and power feeder 29, to equalize the current density, and to stabilize the capacity of electrolytic part 11 to produce the electrolytic product.

Avoidance parts 35, 37 are formed in a hole shape through which protrusion 33 is inserted in stacking direction Z. This can maintain the rigidity of power feeder 29 and inhibit deformation of power feeder 29. As a result, it is possible to stabilize the contact between the electrodes and power feeder 29, to stably maintain the energization area between the electrode and power feeder 29, to equalize the current density, and to stabilize the capacity of electrolytic part 11 to generate the electrolytic product.

An elastic body in contact with one side of stacked body 9 in electrolytic part 11 in stacking direction Z is disposed in housing 13. Positioning member 27 is the elastic body. That is, the contact of stacked body 9 can be stabilized by bringing stacked body 9 into close contact in stacking direction Z by positioning member 27. This can stably maintain the energization area in stacked body 9, equalize the current density, and stabilize the capacity of electrolytic part 11 to generate the electrolytic product. Further, forming positioning member 27 of the elastic body can decrease the number of parts. That is, since the positioning member can be realized by adding a function to the elastic body which is a constituent element, the number of parts can be reduced as compared with the case where the positioning member is configured as a dedicated member.

Positioning member 27 includes a plurality of protrusions 33 protruding in stacking direction Z and positioning at least one electrode of cathode 3 and anode 5 with respect to a planar direction parallel to liquid flowing direction X. This can inhibit displacement of the electrodes in the planar direction parallel to liquid flowing direction X. As a result, it is possible to stably maintain the energization area in electrolytic part 11, to equalize the current density, and to stabilize the capacity of electrolytic part 11 to generate the electrolytic product.

The plurality of protrusions 33 have first protrusion 39 that positions at least one electrode of cathode 3 and anode 5 with respect to the direction (width direction Y) intersecting liquid flowing direction X. This can inhibit displacement of the electrodes in the direction intersecting liquid flowing direction X. As a result, it is possible to stably maintain the energization area in electrolytic part 11, to equalize the current density, and to stabilize the capacity of electrolytic part 11 to generate the electrolytic product.

First protrusion 39 has a cylindrical shape. This can reduce the contact surface between the electrodes and first protrusion 39 of positioning member 27. Therefore, contact resistance at the time of assembling the electrodes decreases. As a result, assemblability of the electrodes to the positioning member 27 can improve.

The plurality of protrusions 33 have second protrusion 41 that positions at least either one electrode of cathode 3 and anode 5 with respect to liquid flowing direction X. This can inhibit displacement of the electrodes in liquid flowing direction X. As a result, it is possible to stably maintain the energization area in electrolytic part 11, to equalize the current density, and to stabilize the capacity of electrolytic part 11 to generate the electrolytic product.

The second protrusion 41 has a rectangular shape. This can increase the contact surface between the electrodes and second protrusion 41 of positioning member 27. As a result, the electrodes can be positioned stably in liquid flowing direction X by second protrusion 41.

Further, at least one electrode of cathode 3 and anode 5 is formed in a polygonal shape. The plurality of protrusions 33 include third protrusion 43 disposed near a corner of at least one electrode of cathode 3 and anode 5. This allows the corner of the electrodes to be positioned by third protrusion 43 and can prevent the electrodes from rotating. As a result, it is possible to stably maintain the energization area in electrolytic part 11, to equalize the current density, and to stabilize the capacity of electrolytic part 11 to generate the electrolytic product.

The plurality of protrusions 33 includes guide part 45 that guides at least one electrode of cathode 3 and anode 5 to the assembly position. This allows guide part 45 to easily guide the electrodes when the electrodes are assembled. As a result, the assembly of the electrodes to positioning member 27 is facilitated, which can improve the assemblability.

Further, positioning member 27 has gap 47 formed between the plurality of protrusions 33 and the outer edge. Therefore, the position of protrusions 33 can be easily changed by adjusting the interval of gap 47. This makes it possible to easily cope with a change in the size of the electrodes. As a result, the degree of freedom in designing the electrodes can further improve.

The height of the plurality of protrusions 33 in stacking direction Z is substantially equal (including equal) to the thickness of the electrodes adjacent to the plurality of protrusions 33. This allows the electrodes to be positioned stably by protrusions 33. Further, it is possible to inhibit interference between protrusions 33 and the peripheral members. As a result, it is possible to stably maintain the energization area in electrolytic part 11, to equalize the current density, and to stabilize the capacity of electrolytic part 11 to generate the electrolytic product.

Second Exemplary Embodiment

Hereinafter, electrolytic liquid generation device 101 according to a second exemplary embodiment of the present disclosure will be described with reference to FIG. 11.

Figure 11:
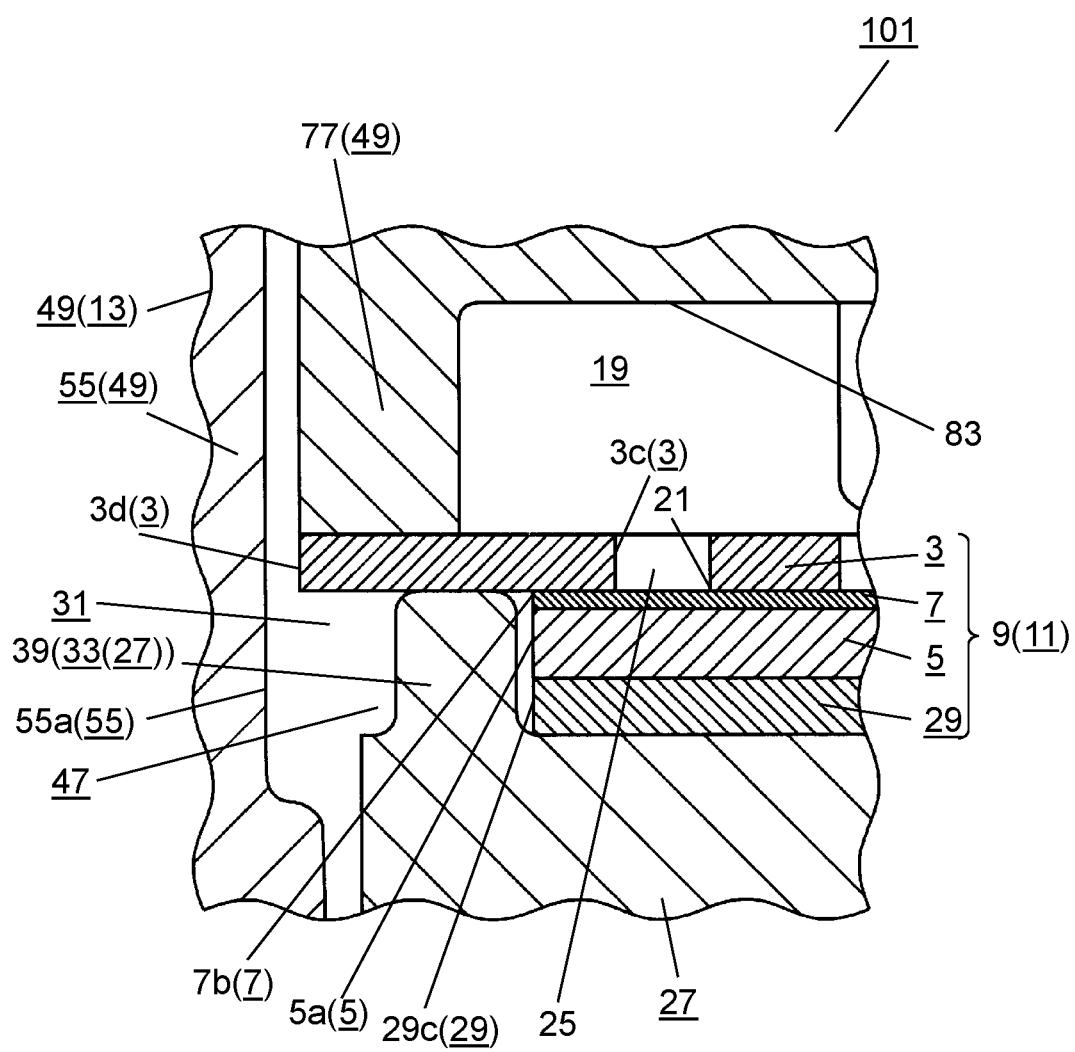
FIG. 11 is an enlarged cross-sectional view of a main part of an electrolytic liquid generation device according to a second exemplary embodiment.

As illustrated in FIG. 11, electrolytic liquid generation device 101 according to the second exemplary embodiment is different from electrolytic liquid generation device 1 according to the first exemplary embodiment in that conductive membrane 7 is positioned by positioning member 27.

Note that the same reference numerals are given to the same configurations as those in the first exemplary embodiment, and the description of the configurations and functions will be omitted by referring to the first exemplary embodiment. Since the configurations are the same as those in the first exemplary embodiment, the effects to be obtained are the same.

As illustrated in FIG. 11, in electrolytic liquid generation device 101 according to the second exemplary embodiment, power feeder 29, anode 5, and conductive membrane 7 are positioned by the plurality of protrusions 33 (in FIG. 11, only first protrusion 39 is illustrated) of positioning member 27. The height of the plurality of protrusions 33 in stacking direction Z is set to be substantially equal (including equal) to the total thickness of power feeder 29, anode 5, and conductive membrane 7 so as to reach the height position of conductive membrane 7 of stacked body 9 stacked on positioning member 27. The plurality of protrusions 33 are disposed to face the side faces 29c, 5a, and 7b of power feeder 29, anode 5, and conductive membrane 7 on both sides in liquid flowing direction X and width direction Y.

Therefore, when power feeder 29, anode 5, and conductive membrane 7 of stacked body 9 try to move in the planar direction parallel to liquid flowing direction X, power feeder 29, anode 5, and conductive membrane 7 come into contact with the plurality of protrusions 33. This restricts movement of stacked body 9 in the planar direction. That is, the plurality of protrusions 33 position power feeder 29, anode 5, and conductive membrane 7 of stacked body 9 with respect to the planar direction parallel to liquid flowing direction X.

In this manner, in electrolytic liquid generation device 101 of the second exemplary embodiment, conductive membrane 7 is positioned by positioning member 27. Therefore, even when conductive membrane 7 is downsized, conductive membrane 7 can be positioned with respect to housing 13 via positioning member 27. This can inhibit displacement of electrolytic part 11 in stacked body 9. As a result, it is possible to stably maintain the energization area in electrolytic part 11, to equalize the current density, and to stabilize the capacity of electrolytic part 11 to generate the electrolytic product.

Third Exemplary Embodiment

Hereinafter, electrolytic liquid generation device 201 according to a third exemplary embodiment of the present disclosure will be described with reference to FIG. 12.

Figure 12:
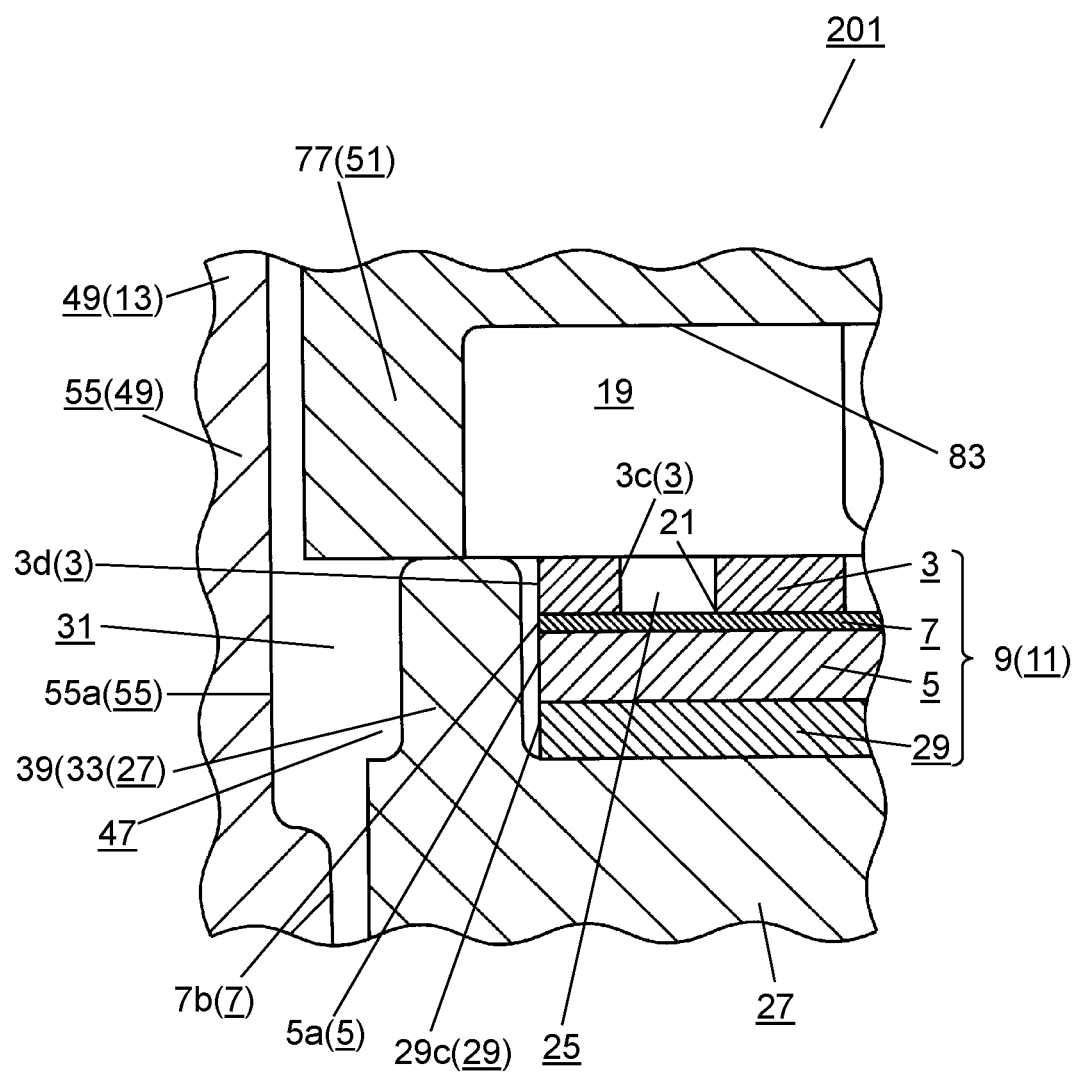
FIG. 12 is an enlarged cross-sectional view of a main part of an electrolytic liquid generation device according to a third exemplary embodiment.

As illustrated in FIG. 12, electrolytic liquid generation device 201 according to the third exemplary embodiment is different from the electrolytic liquid generation devices according to the other exemplary embodiments in that positioning member 27 positions cathode 3 and anode 5.

Note that the same reference numerals are given to the same configurations as those of the other exemplary embodiments, and the description of the configurations and functions will be omitted by referring to the other exemplary embodiments. Since the configurations are the same as those of the other exemplary embodiments, the same effects are obtained.

As illustrated in FIG. 12, in electrolytic liquid generation device 201 according to the third exemplary embodiment, the width of cathode 3 in width direction Y is set substantially equal (including equal) to widths of power feeder 29, anode 5, and conductive membrane 7 in width direction Y. Therefore, cathode 3 cannot be positioned directly with respect to housing 13. Accordingly, cathode 3 is positioned with respect to positioning member 27 positioned with respect to housing 13.

That is, power feeder 29, anode 5, conductive membrane 7, and cathode 3 of stacked body 9 are positioned by the plurality of protrusions 33 (In FIG. 12, only first protrusion 39 is illustrated) of positioning member 27. At this time, the height of protrusion 33 in stacking direction Z is set to be substantially equal to the total thickness of power feeder 29, anode 5, conductive membrane 7, and cathode 3 so as to reach the height position of cathode 3 of stacked body 9 stacked on positioning member 27. The plurality of protrusions 33 are disposed so as to face the side faces 29c, 5a, 7b, and 3d on both sides in the liquid flowing direction X and the width direction Y of power feeder 29, anode 5, conductive membrane 7, and cathode 3.

Therefore, when power feeder 29, anode 5, conductive membrane 7, and cathode 3 of stacked body 9 try to move in a planar direction parallel to liquid flowing direction X, power feeder 29, anode 5, conductive membrane 7, and cathode 3 come into contact with the plurality of protrusions 33. This restricts movement of stacked body 9 in the planar direction. That is, the plurality of protrusions 33 position power feeder 29, anode 5, conductive membrane 7, and cathode 3 of stacked body 9 with respect to a planar direction parallel to liquid flowing direction X.

At this time, cathode 3 of the third exemplary embodiment includes an avoidance part (not illustrated) that is provided on the power-feeding shaft 3b (see FIG. 1) side and avoids contact with second protrusion 41 (see FIG. 5) with respect to stacking direction Z. The avoidance part is preferably formed in a hole shape similarly to the avoidance part 37 (see FIG. 8) provided in power feeder 29 described in the first exemplary embodiment. Forming the avoidance part into a hole shape can maintain rigidity of cathode 3.

In this manner, in electrolytic liquid generation device 201 according to the third exemplary embodiment, cathode 3 and anode 5 are positioned by positioning member 27. Therefore, even when cathode 3 is downsized, cathode 3 can be positioned with respect to housing 13 via positioning member 27. This can inhibit displacement of electrolytic part 11 in stacked body 9. As a result, it is possible to stably maintain the energization area in electrolytic part 11, to equalize the current density, and to stabilize the capacity of electrolytic part 11 to generate the electrolytic product.

Note that, the above exemplary embodiments are to exemplify the techniques in the present disclosure, and therefore, various modifications, replacements, additions, omissions, and the like can be made in the scope of the claims or in an equivalent scope thereof.

For example, in the above exemplary embodiments, the configuration in which the positioning projection of the housing is inserted into the positioning recess to cause the positioning member to be positioned with respect to the housing has been described as an example, but the present disclosure is not limited thereto. For example, the positioning member may be positioned by providing a plurality of projections on the outer face of the positioning member and bringing the projections into contact with the inner face of the housing. Further, the positioning member may be positioned by bringing outer face of the positioning member directly to the inner face of the housing.

In the above exemplary embodiments, an example in which the positioning member is formed of an elastic body has been described, but the present disclosure is not limited thereto. For example, the stacked body may be positioned using a positioning member formed separately from the elastic body.

In the above exemplary embodiments, an example in which the shape of the first protrusion is a cylindrical shape has been described, but the present disclosure is not limited thereto. For example, any shape such as a rectangular prism shape may be used. Similarly, the shape of the second protrusion is not limited to the rectangular shape and may be any shape such as a cylindrical shape.

In the above exemplary embodiments, an example in which the shape of the electrodes is a rectangular polygonal shape has been described, but the present disclosure is not limited to this example. For example, any shape such as a circular shape may be used. Further, the polygonal shape of the electrodes is not limited to a quadrangular shape and may be any shape as long as it has more than or equal to three edges and vertices, for example, a pentagonal shape.

INDUSTRIAL APPLICABILITY

The present disclosure is applicable to an electrolytic liquid generation device in which a stacked body can be downsized and the concentration of an electrolytic product in an electrolytically treated liquid can be increased. The present disclosure can be specifically applicable to water treatment equipment such as water purifiers, washing machines, dish washers, warm water bidet toilet seats, refrigerators, water heaters/servers, sterilizers, medical instruments, air conditioners, and kitchen equipment.

REFERENCE MARKS IN THE DRAWINGS 1, 101, 201: electrolytic liquid generation device
3: cathode (electrode)
3a, 29a: spring
3b, 29b: power-feeding shaft
3c: cathode hole
3d, 5a, 7b, 29c: side face
5: anode (electrode)
7: conductive membrane
7a: conductive membrane hole
9: stacked body
11: electrolytic part
13: housing
15: inlet port
15a: hole
17: outlet port
19: flow path
21, 23: interface
25: slot
27: positioning member (elastic body)
29: power feeder
31: space
33: protrusion
35, 37: avoidance part
39: first protrusion
41: second protrusion
43: third protrusion
45: guide part
47: gap
49: electrode case
51: electrode case lid
53: bottom wall
53a, 55a: inner face
55: peripheral wall
57: flange
59: housing recess
61: through-hole
63: fitting projection
65: protrusion
67: O-ring
69: washer
71: spring washer
73: hex nut
75: lid body
77: flow path projection
79: fitting recess
81: groove
83: flow path groove
83a: cylindrical protrusion
85: positioning recess
87: positioning projection
X: liquid flowing direction
Y: width direction
Z: stacking direction

The invention claimed is:

1. An electrolytic liquid generation device comprising:
an electrolytic part that electrolyzes a liquid, the electrolytic part including a stacked body, the stacked body including (i) a cathode and an anode constituting electrodes adjacent to each other and (ii) a conductive membrane interposed between the cathode and the anode; and
a housing in which the electrolytic part is disposed, wherein:
the housing includes:
an inlet port through which a liquid to be supplied to the electrolytic part flows in;
an outlet port through which an electrolytic liquid generated in the electrolytic part flows out; and
a flow path in which a liquid flowing direction intersects a stacking direction of the stacked body,
the electrolytic part includes a slot that is open to the flow path and is formed to cause at least a part of interfaces between the conductive membrane and the respective electrodes to be exposed,
in the housing, a positioning member is disposed with respect to the housing,
the positioning member includes a plurality of first protrusions, each of which protrudes in the stacking direction,
two or more of the plurality of first protrusions are provided at each of longitudinal sides of one of the cathode or the anode, the longitudinal sides extending in the liquid flowing direction, and
a top surface of each of the plurality of first protrusions faces a bottom face of another of the cathode or the anode.

2. The electrolytic liquid generation device according to claim 1, wherein
the stacked body includes a power feeder that is in contact with one of the electrodes, and
the power feeder is positioned by the positioning member.

3. The electrolytic liquid generation device according to claim 1, comprising a space disposed between an outer periphery of at least either the cathode or the anode and an inner face of the housing, the space inhibiting the liquid from remaining.

4. The electrolytic liquid generation device according to claim 2, wherein the power feeder has a width in a direction intersecting the liquid flowing direction substantially equal to a width of the electrodes in contact with the power feeder.

5. The electrolytic liquid generation device according to claim 2, wherein
the positioning member includes a second protrusion that protrudes in the stacking direction and positions the power feeder, and
the power feeder includes an avoidance part that avoids contact with the second protrusion with respect to the stacking direction.

6. The electrolytic liquid generation device according to claim 5, wherein the avoidance part is formed in a hole shape into which the second protrusion is inserted in the stacking direction.

7. The electrolytic liquid generation device according to claim 1, wherein the conductive membrane is positioned by the positioning member.

8. The electrolytic liquid generation device according to claim 1, wherein
an elastic body is disposed in the housing, the elastic body being in contact with one side of the electrolytic part in the stacking direction of the stacked body, and
the positioning member is the elastic body.

9. The electrolytic liquid generation device according to claim 1, wherein each of the plurality of first protrusions has a cylindrical shape.

10. The electrolytic liquid generation device according to claim 5, wherein a second protrusion positions at least either the cathode or the anode of the electrodes with respect to the liquid flowing direction.

11. The electrolytic liquid generation device according to claim 10, wherein the second protrusion has a rectangular shape when viewed from the stacking direction.

12. The electrolytic liquid generation device according to claim 1, wherein
at least either the cathode or the anode of the electrodes is formed in a polygonal shape, and
at least one of the plurality of first protrusions is disposed near a corner of at least either the cathode or the anode of the electrodes.

13. The electrolytic liquid generation device according to claim 1, wherein the plurality of first protrusions include a guide part that guides at least either the cathode or the anode of the electrodes to an assembly position.

14. The electrolytic liquid generation device according to claim 1, wherein the positioning member has a gap disposed between the plurality of first protrusions and an outer edge of the positioning member.

15. The electrolytic liquid generation device according to claim 1, wherein:
a width of the another of the cathode or the anode is greater than a width of the one of the cathode or the anode, and
the top surface of each of the plurality of first protrusions is in contact with the bottom face of the another of the cathode or the anode.

16. The electrolytic liquid generation device according to claim 1, wherein:
a width of the another of the cathode or the anode is greater than a width of the one of the cathode or the anode, and
a gap is provided between the top surface of each of the plurality of first protrusions and the bottom face of the another of the cathode or the anode.

\* \* \* \* \*